United States Patent
Bostanjoglo et al.

(10) Patent No.: US 9,884,391 B2
(45) Date of Patent: Feb. 6, 2018

(54) LASER METHOD WITH DIFFERENT LASER BEAM AREAS WITHIN A BEAM AND DEVICES

(71) Applicant: SIEMENS AKTIENGESELLSCHAFT, München (DE)

(72) Inventors: Georg Bostanjoglo, Berlin (DE); Bernd Burbaum, Falkensee (DE)

(73) Assignee: SIEMENS AKTIENGESELLSCHAFT (DE)

( * ) Notice: Subject to any disclaimer, the term of this patent is extended or adjusted under 35 U.S.C. 154(b) by 342 days.

(21) Appl. No.: 14/770,902

(22) PCT Filed: Feb. 14, 2014

(86) PCT No.: PCT/EP2014/052939
§ 371 (c)(1),
(2) Date: Aug. 27, 2015

(87) PCT Pub. No.: WO2014/135358
PCT Pub. Date: Sep. 12, 2014

(65) Prior Publication Data
US 2016/0008919 A1  Jan. 14, 2016

(30) Foreign Application Priority Data
Mar. 7, 2013  (EP) .................... 13158185

(51) Int. Cl.
| | |
|---|---|
| B23K 26/21 | (2014.01) |
| B23K 26/34 | (2014.01) |
| B23K 26/352 | (2014.01) |
| B23K 26/354 | (2014.01) |
| B23K 26/00 | (2014.01) |
| B23K 26/06 | (2014.01) |

(Continued)

(52) U.S. Cl.
CPC ........ *B23K 26/0081* (2013.01); *B23K 26/064* (2015.10); *B23K 26/067* (2013.01); *B23K 26/0648* (2013.01); *B23K 26/0676* (2013.01); *B23K 26/34* (2013.01); *C22B 9/221* (2013.01)

(58) Field of Classification Search
CPC ........ B23K 26/00; B23K 26/20; B23K 26/21; B23K 26/34; B23K 26/352; B23K 26/354
USPC ............ 219/121.63–121.66, 121.76, 121.77
See application file for complete search history.

(56) References Cited

U.S. PATENT DOCUMENTS

| | | | | |
|---|---|---|---|---|
| 6,175,096 | B1 * | 1/2001 | Nielsen ................. | B23K 26/06 219/121.72 |
| 9,500,781 | B2 * | 11/2016 | Watanabe ......... | B23K 26/0648 |
| 2006/0157457 | A1 * | 7/2006 | Sakurai ............ | B23K 26/0604 219/121.76 |

FOREIGN PATENT DOCUMENTS

| | | |
|---|---|---|
| DE | 40 34 745 A1 | 7/1991 |
| EP | 0 865 863 A1 | 9/1998 |

(Continued)

OTHER PUBLICATIONS

International Search Report dated Jul. 3, 2014 issued in corresponding International patent application No. PCT/EP2014/052939.

(Continued)

*Primary Examiner* — Samuel M Heinrich
(74) *Attorney, Agent, or Firm* — Ostrolenk Faber LLP

(57) ABSTRACT

Use of a laser beam (1) which has one external and one internal laser beam area (4,7) with different intensities enables a higher temperature gradient to be produced in the z-direction.

20 Claims, 2 Drawing Sheets

(51) Int. Cl.
*B23K 26/067* (2006.01)
*B23K 26/064* (2014.01)
*C22B 9/22* (2006.01)

(56) References Cited

FOREIGN PATENT DOCUMENTS

| | | |
|---|---|---|
| EP | 2 186 594 A1 | 5/2010 |
| JP | H 04-182087 | 6/1992 |
| JP | H 04-182088 | 6/1992 |

OTHER PUBLICATIONS

Written Opinion dated Jul. 3, 2014 issued in corresponding International patent application No. PCT/EP2014/052939.
European Search Report, dated Sep. 20, 2013, issued in corresponding European Patent Application No. EP13158185.2. Total 6 pages.

* cited by examiner

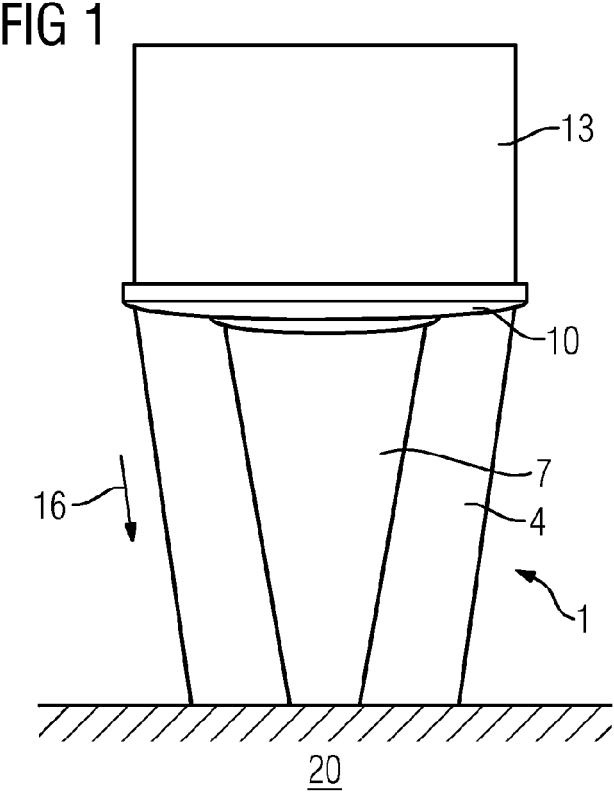
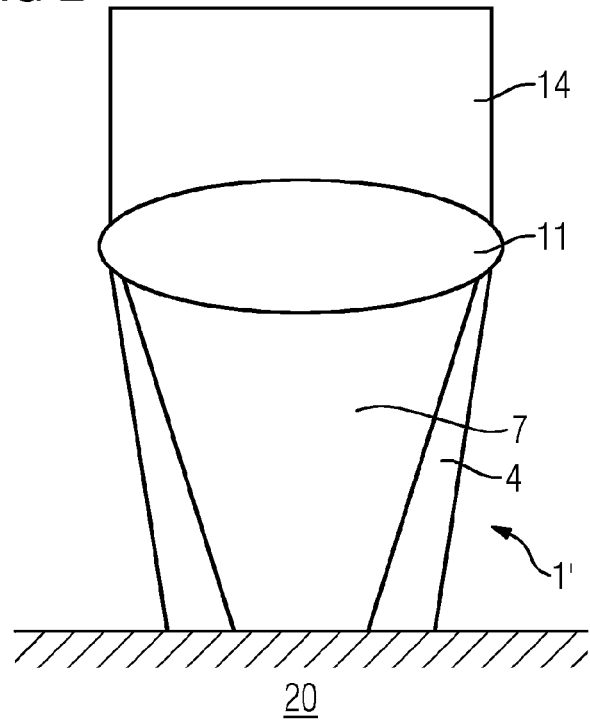

LASER METHOD WITH DIFFERENT LASER BEAM AREAS WITHIN A BEAM AND DEVICES

CROSS-REFERENCE TO RELATED APPLICATIONS

The present application is a 35 U.S.C. §§ 371 national phase conversion of PCT/EP2014/052939, filed Feb. 14, 2014, which claims priority of European Patent Application No. 13158185.2, filed Mar. 7, 2013, the contents of which are incorporated by reference herein. The PCT International Application was published in the German language.

The invention relates to a laser method in which a laser beam that has two different laser beam areas is used and relates to devices therefor.

TECHNICAL BACKGROUND

Laser welding methods for remelting cracks or for deposition welding on a substrate are state of the art. When welding is performed, there is generally a problem that cracks may occur within remelted material or deposition welding. This has been solved by preheating the entire component.

BRIEF DESCRIPTION OF THE INVENTION

In monocrystalline rewelding or monocrystalline deposition welding, an object is to produce a great temperature gradient. It is therefore an object of the invention to provide a method and devices with which this can be made easier. The object is achieved by a method and device as disclosed herein.

The invention simplifies operative and procedural preheating during welding and produces greater temperature gradients.

BRIEF DESCRIPTION OF THE DRAWINGS

FIG. 1 shows a first embodiment of a laser beam according to the invention;

FIG. 2 shows a second embodiment thereof; and

FIGS. 1, 2, and 3 show the invention schematically.

DESCRIPTION OF EMBODIMENTS

Figure 3:
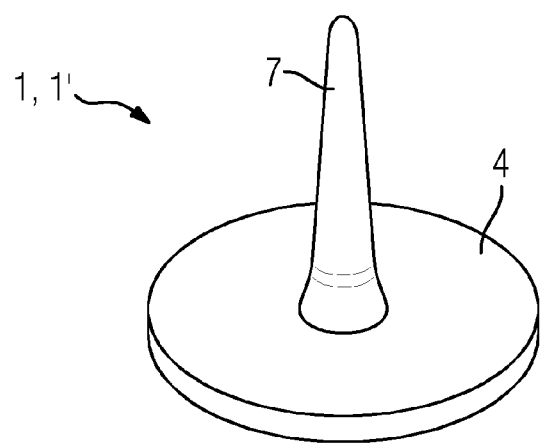
FIG. 3 is an oblique view of a laser intensity distribution using either embodiment hereof.

The figures and the description represent exemplary embodiments of the invention.

FIG. 1 shows a laser beam 13, which is redirected by a lens 10 into a laser beam 1, which has two different laser beam areas 7, 4 when the laser beam is incident on a substrate 20.

Inside the laser beam 1, there is an internal laser beam area 7, which has a higher intensity or output, preferably of 200 W to 300 W, and can remelt a crack in the substrate 20 or can melt material for a deposition process on the substrate which is well known in the art.

The internal laser beam area 7 is surrounded, preferably completely, by an external laser beam area 4, which has a greater cross section, particularly a greater diameter, and has a lower intensity or a lower output, so that, when the laser beam 1 is moved to be incident on or impinge on and over the substrate 20, the external laser beam area 4 only preheats and post-heats the area before and after the internal laser beam area 7 as the laser beam moves.

In one example, the diameter of the internal laser beam area 7 is 3 mm and the diameter of the external laser beam area 4 is at least 3.5 mm, particularly at least 4 mm, most particularly 4 mm.

The internal laser beam area 7 is preferably arranged concentrically in the external area 4.

Such a laser beam 1 may preferably be produced by a bifocal lens 10, in which a laser beam 1 with a single wavelength λ is correspondingly separated by the bifocal lens 10 into an internal laser beam area 7 and an external laser beam area 4.

The arrow 16 indicates that at this point there can be a supply of a known welding material, like a welding powder, which is to be melted by the laser beam 1, particularly by the internal laser beam area 7, and that leads to deposition welding.

In FIG. 2, another embodiment for producing such a laser beam 1' is that an incoming laser beam 14 has two different wavelengths $\lambda_1$, $\lambda_2$, which are refracted to different degrees by a single lens 11 and thus produce the different laser beam areas 7, 4.

This intensity distribution according to FIGS. 1 and 2 has the effect that the temperature gradient perpendicularly to the substrate 20 increases. Such a laser beam 1, 1' can preferably be used in monocrystalline remelting or deposition welding.

An example of a substrate that has a directionally solidified structure is PWA 1483SX, which produces a monocrystalline structure.

The ratio of the intensities or the outputs of the laser beam areas 4, 7 in relation to one another is at least 1.2, in particular at least 1.5.

The surface area of the internal laser beam area 7 is preferably a maximum of 80% of the internal laser beam area 7 and the external laser beam area 4.

This construction according to FIG. 1 or 2 makes very easy handling possible, and there is also no directional dependence due to the use of an annular array optical system.

FIG. 3, hows a laser beam intensity distribution according to the invention.

The invention claimed is:

1. A method for applying a laser beam to a substrate for heating the substrate where the laser beam impinges on the substrate, the method comprising:
    applying a laser beam to impinge on the substrate, impinging the laser beam to have two different laser beam areas which impinge on the substrate, wherein the two different laser beam areas differ in at least one of output of the laser beam areas and wavelengths of the laser beam areas; and
    wherein the laser beam has a radially internal laser beam area, and a surrounding radially external laser beam area, and the external laser beam area completely surrounding the internal laser beam area.

2. The method as claimed in claim 1, in which the external laser beam area has an intensity such that the external laser beam areas does not melt the substrate or a material supplied to the substrate to be impinged upon on the substrate.

3. The method as claimed in claim 1, wherein the substrate to be impinged upon is metallic.

4. The method as claimed in claim 1, further comprising remelting a crack in the substrate at the laser beam areas.

5. The method as claimed in claim 1, further comprising: applying a welding material to the substrate on which the laser beam is impinging and performing deposition welding on the material by impinging the laser beam such that the deposition welding takes place.

6. The method as claimed in claim 1, further comprising: impinging the laser beam on the substrate such that the internal laser beam area is arranged concentrically within the area surrounded by the external laser beam area.

7. The method as claimed in claim 1, wherein an intensity or an output of the internal laser beam area is at least 20% greater than an intensity or an output of the external laser beam area for either causing more intensive heating of the substrate, or melting of welding material on the substrate, or melting of the substrate.

8. The method as claimed in claim 1, further comprising configuring the laser beam and operating the laser beam such that the internal laser beam area has an output of 200 W to 300 W, and has a selected diameter of the output of 3 mm.

9. The method as claimed in claim 1, wherein the diameter of the external laser beam area is at least 3.5 mm.

10. The method as claimed in claim 1, further comprising forming the laser beam areas and aiming the laser beam at the substrate such that the internal laser beam area on the substrate is a maximum of 80% of a surface area of the external laser beam area on the substrate (20).

11. The method as claimed in claim 1, wherein an intensity or an output of the internal laser beam area is at least 50% greater than an intensity or an output of the external laser beam area for either causing more intensive heating of the substrate, or melting of welding material on the substrate, or melting of the substrate.

12. The device according to claim 1, wherein the diameter of the external laser beam area is at least 4.5 mm.

13. The device according to claim 1, wherein the diameter of the external laser beam area is at least 4 mm.

14. The device according to claim 1, further comprising applying the laser beam to the substrate to remelt a crack in the substrate, wherein the substrate is of metal.

15. A device for producing a laser beam comprised of two laser beam areas for carrying out a method on a substrate as claimed in claim 1, the device comprising:
a bifocal lens configured for separating a laser beam with a wavelength into the two separate laser beam areas including an internal laser beam area and an external laser beam area external to the internal laser beam area.

16. A device according to claim 15, wherein the bifocal lens is configured for separating and forming the two laser beam areas such that the internal laser beam area is arranged concentrically within the area surrounded by the external laser beam area.

17. The device of claim 15, wherein the substrate is of metal and the laser beam is for remelting a crack in the substrate.

18. A device for producing a laser beam comprised of two laser beam areas for carrying out a method on a substrate as claimed in claim 1, wherein the device is configured and operable to produce a laser beam including two wavelengths, the device comprising:
a single lens configured to split the laser beam with two different wavelengths, wherein that laser beam is incident on the lens, into two laser beam areas, wherein each laser beam area is a respective one of the two wavelengths, wherein the two laser beam areas comprise an internal laser beam area and an external laser beam area external to the internal laser beam area.

19. A device according to claim 18, wherein the single lens is configured for separating and forming the two laser beam areas such that the internal laser beam area is arranged concentrically within the area surrounded by the external laser beam area.

20. The device of claim 18, comprised of two laser beam areas for carrying out a method on a substrate as claimed in claim 1, the device having a bifocal lens configured for separating a laser beam with a wavelength into two separate laser beam areas of different respective wave lengths including an internal laser beam area and an external laser beam area external to the internal laser beam area.

* * * * *